United States Patent [19]
Wicks

[11] Patent Number: 5,673,169
[45] Date of Patent: Sep. 30, 1997

[54] WALL MOUNTED PERSONAL COMMUNICATIONS ROUTING SYSTEM

[75] Inventor: James E. Wicks, Tarrytown, N.Y.

[73] Assignees: Sony Corporation, Tokyo, Japan; Sony Corp. of America, New York, N.Y.

[21] Appl. No.: 538,329

[22] Filed: Oct. 3, 1995

[51] Int. Cl.$^6$ ........................................................ H05K 7/00
[52] U.S. Cl. ................................................ 361/680; 361/679
[58] Field of Search ................................ 361/679–683; D14/100, 102; 364/708.7

[56] References Cited

U.S. PATENT DOCUMENTS

| | | | |
|---|---|---|---|
| D. 294,250 | 2/1988 | Watanabe et al. | D14/53 |
| D. 318,661 | 7/1991 | Fuqua et al. | D14/151 |
| D. 321,340 | 11/1991 | Savio | D14/100 |
| D. 324,036 | 2/1992 | Wakasa | D14/101 |
| D. 330,015 | 10/1992 | Yoshihara | D14/101 |
| D. 331,409 | 12/1992 | Goldsmith et al. | D14/218 |
| D. 350,743 | 9/1994 | Hicks, III et al. | D14/130 |
| D. 356,791 | 3/1995 | Desbarats | D14/130 |
| D. 368,895 | 4/1996 | Andre et al. | D14/101 |
| 5,187,641 | 2/1993 | Muskatello et al. | 361/680 X |
| 5,388,032 | 2/1995 | Gill et al. | 361/681 X |
| 5,539,615 | 7/1996 | Sellers | 361/680 |

*Primary Examiner*—Leo P. Picard
*Assistant Examiner*—Jayprakash N. Gandhi
*Attorney, Agent, or Firm*—Pasquale Musacchio; Jerry A. Miller

[57] ABSTRACT

A computer system for use on either a horizontal surface or a vertical wall. The system includes a computer having a base. The system further includes a viewing device for displaying information from the computer. The device is rotatably mounted to the computer to enable rotation of the computer and the device relative to each other. The system further includes a keyboard having keys for inputting commands to the computer. The keyboard is rotatably mounted to the computer to enable rotation of the keyboard relative to the computer. Upon placement of the base on the desk top or vertical wall, the device is rotatable to a substantially vertical position suitable for viewing the device. Further, when the base is positioned on the horizontal surface, the keyboard may be rotated to a substantially horizontal orientation. In addition, when the base is positioned on the vertical wall, the keyboard may be rotated to a substantially vertical orientation suitable for accessing the keyboard.

19 Claims, 6 Drawing Sheets

WALL MOUNTED PERSONAL COMMUNICATIONS ROUTING SYSTEM

The disclosure of four related and co-pending patent applications, the first application being Serial No. 08/538,690, filed on Oct. 3, 1995, entitled INTELLIGENT BULLETIN BOARD LOCAL PERSONAL COMMUNICATIONS ROUTER, Attorney Docket No. 50J1340, wherein the inventors are James E. Wicks and Kazuto Mugura, the second application being Ser. No. 538,380, filed on Oct. 3, 1995, entitled USER INTERFACE AND RULE PROCESSING FOR A PERSONAL COMMUNICATIONS ROUTING SYSTEM, Attorney Docket No. 50J1341, wherein the inventors are James E. Wicks, Kazuto Mugura and Toshiya Fujii, the third application being Ser. No. 29/044,926, filed on Oct. 3, 1995, entitled TELEPHONE HANDSET AND CRADLE OR SIMILAR ARTICLE, Attorney Docket No. 50J1344, wherein the inventor is James E. Wicks, and the fourth application being Ser. No. 29/044,933, filed on Oct. 3, 1995, entitled TERMINAL DEVICE OR SIMILAR ARTICLE, Attorney Docket No. 50J1345, wherein the inventor is James E. Wicks, is hereby incorporated by reference.

FIELD OF THE INVENTION

This invention relates to a personal communications routing system, and more particularly, to a personal communications routing system which may be either wall mounted or located on a desk top.

BACKGROUND OF THE INVENTION

A personal computer (PC) system generally includes components such as a computer, monitor, keyboard, mouse, and mouse pad. Typically, many of these components are located on a desk top or other horizontal work surface during use. However, such components are relatively large in size and are spread about the desk top. This reduces the amount of space available on the work surface and for the location of telephones and other office equipment. Further, with the advent of built in modems, laptop/docking station configurations and other technology, the size of these components has increased, thus further decreasing the amount of space that is available.

In a small office environment, such as that found in a home or a small business, a PC having communication capabilities is typically utilized. However, access to the communication capabilities of the PC is frequently difficult and often requires the user to go through layer upon layer of applications. It is desirable in such small office environments to provide a personal communications routing system that operates in conjunction with the PC. By way of example, the routing system may provide delivery and forwarding of electronic mail and the integration of various electronic devices such as pagers, answering machines, telephones, and personal communicators. The routing system may also provide access to information sources such as data bases and further, may provide a network interface to various network resources. As such, the routing system serves to augment the PC already being used so as to simplify access to the communications capabilities of the PC. A routing system is described in four related and co-pending patent applications, the first application being Ser. No. 08/538,690, filed on Oct. 3, 1995, entitled INTELLIGENT BULLETIN BOARD LOCAL PERSONAL COMMUNICATIONS ROUTER, Attorney Docket No. 50J1340, wherein the inventors are James E. Wicks and Kazuto Mugura, the second application being Ser. No. 08/538,330, filed on Oct. 3, 1995, entitled USER INTERFACE AND RULE PROCESSING FOR A PERSONAL COMMUNICATIONS ROUTING SYSTEM, Attorney Docket No. 50J1341, wherein the inventors are James E. Wicks, Kazuto Mugura and Toshiya Fujii, the third application being Ser. No. 29/044,926, filed on Oct. 3, 1995, entitled TELEPHONE HANDSET AND CRADLE OR SIMILAR ARTICLE, Attorney Docket No. 50J1344, wherein the inventor is James E. Wicks, and the fourth application being Ser. No. 29/044,953, filed on Oct. 3, 1995, entitled TERMINAL DEVICE OR SIMILAR ARTICLE, Attorney Docket No. 50J1345, wherein the inventor is James E. Wicks. In particular, the routing system may include components such as a small capacity computer having a keyboard and a viewing device such as an liquid crystal display (LCD) panel, video graphics array (VGA), or National Television Standards Committee monitor. However, such components occupy a substantial amount of space on the desk top, thus reducing the work surface that is available. Further, if the routing system is used on the same desk top as its associated personal computer, the amount of space that is available is substantially reduced. Therefore, there is a need in the art for a computer system that enables an increase in the amount of space that is available on a desk top.

SUMMARY OF THE INVENTION

A computer system which includes a computer having a base. The system further includes a viewing device for displaying information from the computer. The device is rotatably mounted to the computer to enable rotation of the computer and the device relative to each other. In addition, the system includes a keyboard having keys for inputting commands to the computer. The keyboard is rotatably mounted to the computer to enable rotation of the keyboard relative to the computer, wherein upon placement of the base on a surface, the device is rotatable to a substantially vertical position suitable for viewing the device. In addition, the keyboard is also rotatable to a substantially vertical position suitable for accessing the keyboard.

DESCRIPTION OF THE INVENTION

Figure 1:
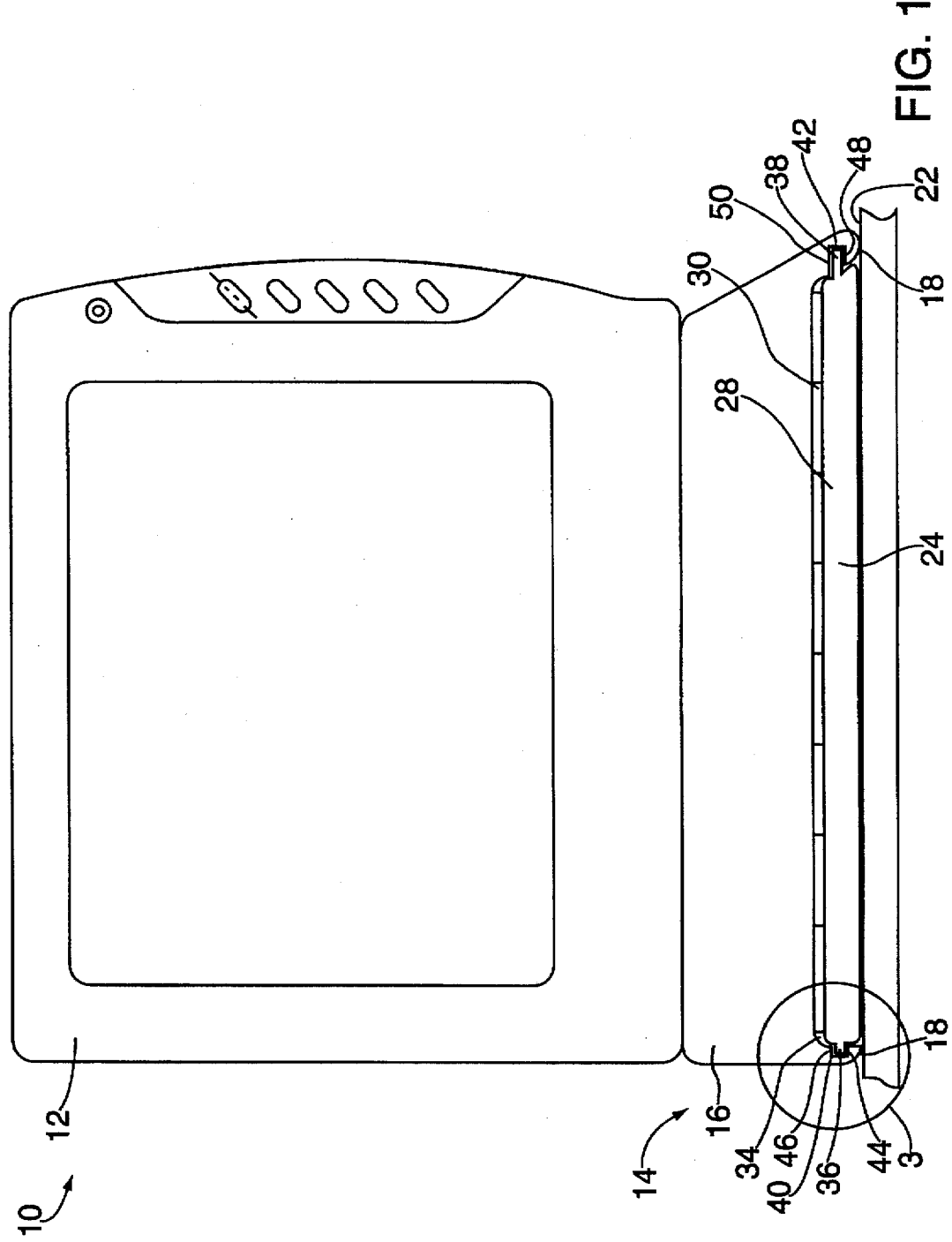
FIG. 1 is a from view of a personal communications routing system in accordance with the present invention.

The present invention will now be described referring to FIGS. 1–6, wherein like elements are designated by like reference numerals.

Figure 2:
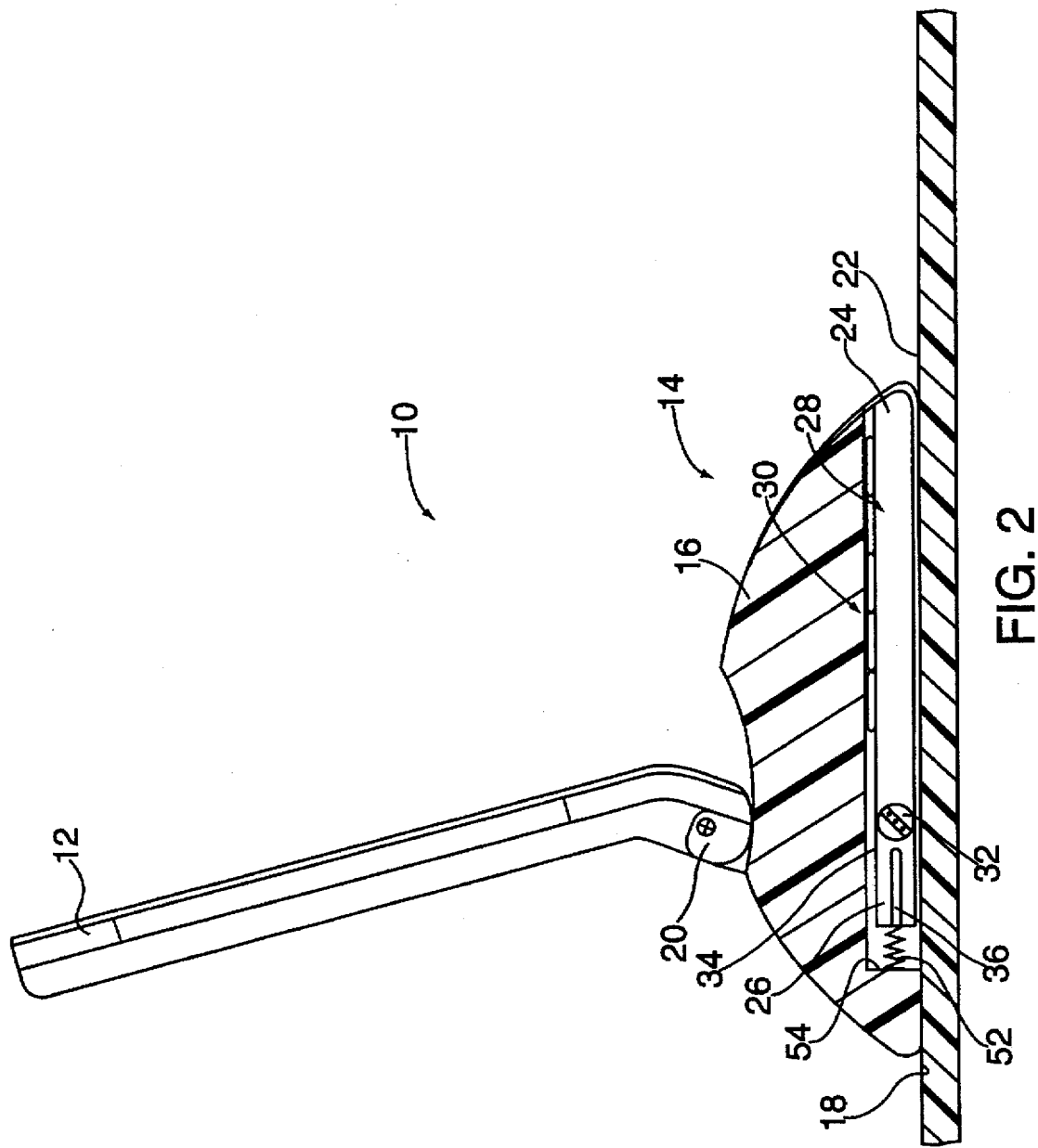
FIG. 2 is a partial cross sectional side view of the routing system.

Referring to FIGS. 1 and 2, a front and a partial cross sectional side view, respectively, of a personal communications routing system 10 is shown. The system 10 serves to augment a PC so as to simplify access to the communications capabilities of the PC. By way of example, the system 10 may provide delivery and forwarding of electronic mail and the integration of various electronic devices such as pagers, answering machines, telephones, and personal communicators. The system 10 may also provide access to information sources such as data bases and further, may provide a network interface to various network resources. In addition, it is noted that the present invention is applicable to other computer configurations.

The system 10 includes a viewing device 12 such as an LCD panel, VGA, or NTSC monitor or the like for displaying a simple user interface. In particular, the user interface may display whether or not a user has received communication such as electronic mail, voice messages, faxes, and others. The system 10 further includes a small capacity computer 14 having a housing 16 which includes a base surface 18. The device 12 is rotatably attached to the housing 16 by a first hinge element 20. The first hinge element 20 enables rotation of the device 12 between substantially vertical and horizontal orientations as desired. In a desk top configuration, the base surface 18 is oriented horizontally on a horizontal desk top 22 and the device 12 is rotated to a substantially vertical orientation suitable for viewing the device 12.

In addition, the system 10 includes a keyboard 24 having a main block section 26 and an input key section 28 which includes keys 30 for inputting commands to the computer 14. The input key section 28 is rotatably attached to the main block section 26 by a second hinge element 32. The second hinge element 32 enables rotation of the input key section 28 relative to the main block section 26. The housing 16 further includes a cavity 34 sized to accommodate the main block section 26 and the input key section 28. In a stowed position, the main block section 26 and the input key section 28 are positioned within the cavity 34 and are substantially concealed, thus increasing the amount of work surface that is available when the input key section 28 is not being used. Further, the housing 16 may include a latching mechanism for holding the keyboard in the stowed position.

Figure 3:
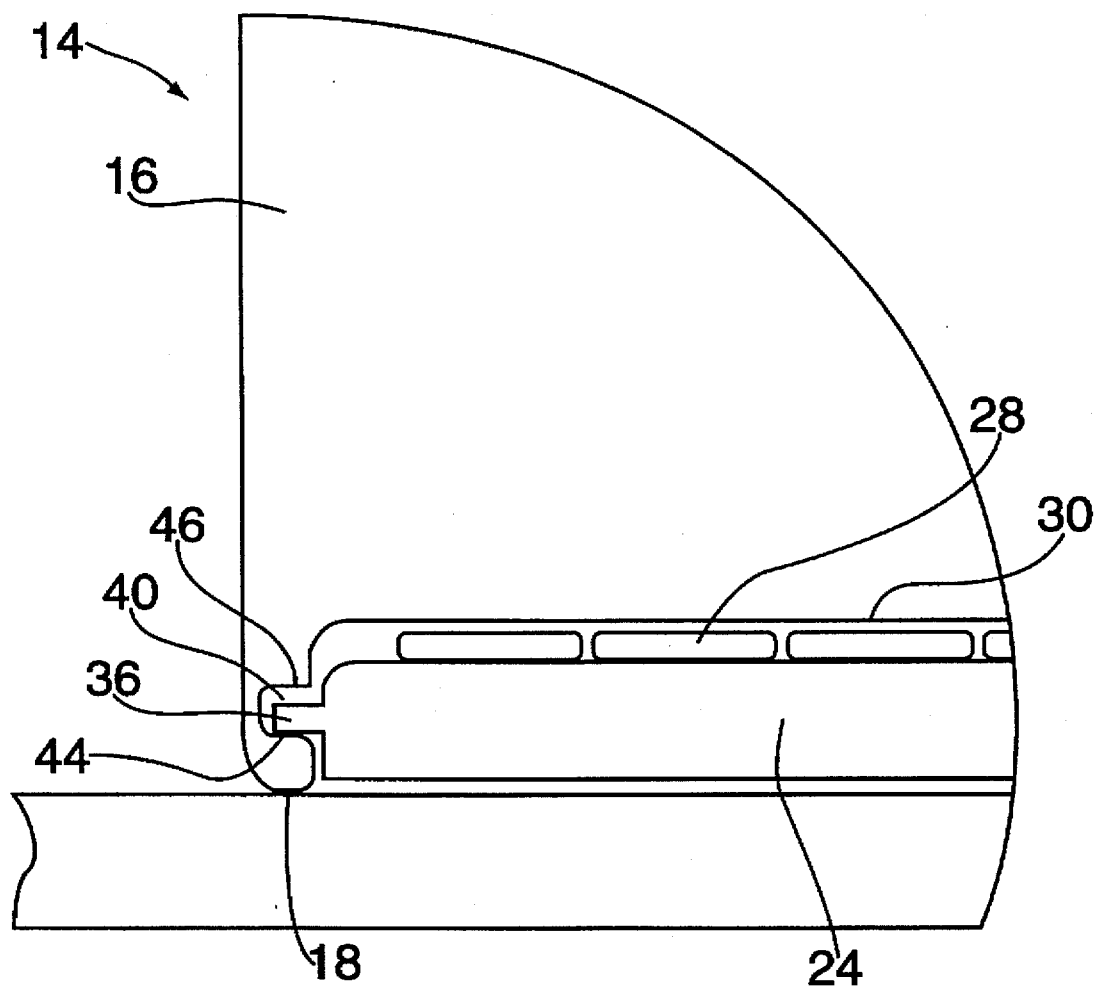
FIG. 3 is an enlarged view of balloon section 3 of FIG. 1.

First 36 and second 38 projecting portions extend outwardly from the main block section 26. The first 36 and second 38 projecting portions extend into first 40 and second 42 slots, respectively, formed in the housing 16. Referring to FIG. 3, an enlarged view of balloon section 3 of FIG. 1 is shown. In FIG. 3, only the first projecting portion 36 and the first slot 40 are shown for purposes of illustration. It is noted that the second projecting portion 38 and the second slot 42 have a configuration similar to that of the first projecting portion 36 and the first slot 40, respectively. The first slot 40 has a substantially C-shaped configuration having a first sliding surface 44 and a spaced apart first upper surface 46. The first projecting portion 36 extends between the first sliding 44 and upper 46 surfaces and is adapted to slide upon the first sliding surface 44. The second slot 42 has a substantially reverse C-shaped configuration having a second sliding surface 48 and a spaced apart second upper surface 50. The second projecting portion 38 extends between the second sliding 48 and upper 50 surfaces and is adapted to slide upon the second sliding surface 48. Sliding of the first 36 and second 38 projecting portions enables the main block section 26 to move within the cavity 34, thus enabling movement of the input key section 28 between the stowed position and an exposed position. The housing 16 further includes at least one spring 52 or other similar mechanism located between the main block section 26 and an interior surface 54 of the housing 16. In the stowed position, the spring 52 is biased to urge the main block section 26, and thus the input key section 28, outward. In a preferred embodiment, the spring 52 urges the main block section 26 outward so that a front portion of the input key section 28 protrudes from the cavity 34. This enables the user to grasp the front portion in order to extract the input key section 28 from the cavity 34. It is noted that other types of mechanisms may also be utilized to move the main block section 26. Alternatively, the front portion may include a handle which may be grasped by the user to extract the input key section 28.

Figure 4:
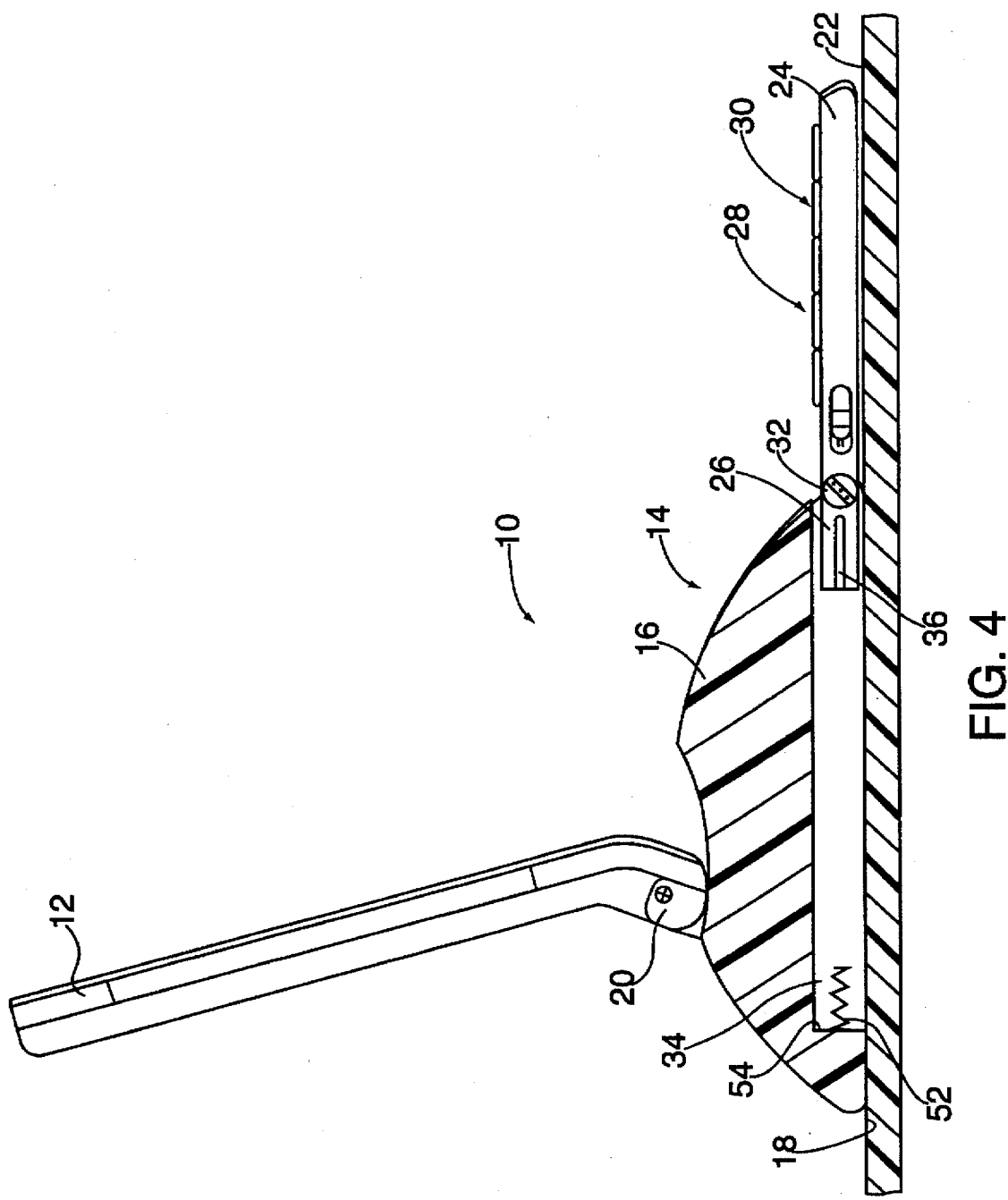
FIG. 4 is a view of an input key section in an exposed position.

Referring to FIG. 4, the input key section 28 is shown in the exposed position. In this position, the input key section 28 is located outside of the cavity 34 so as to provide access to the keys 30. The input key section 28 may be rotated between substantially horizontal and vertical orientations as desired due to the second hinge element 32. In the desk top configuration, the input key section 28 is positioned in a substantially horizontal orientation to provide access to the keys 30. Further, the second hinge 32 element may include a locking mechanism to lock the second hinge element 32 and hold the input key section 28 in a desired orientation during use.

Figure 5:
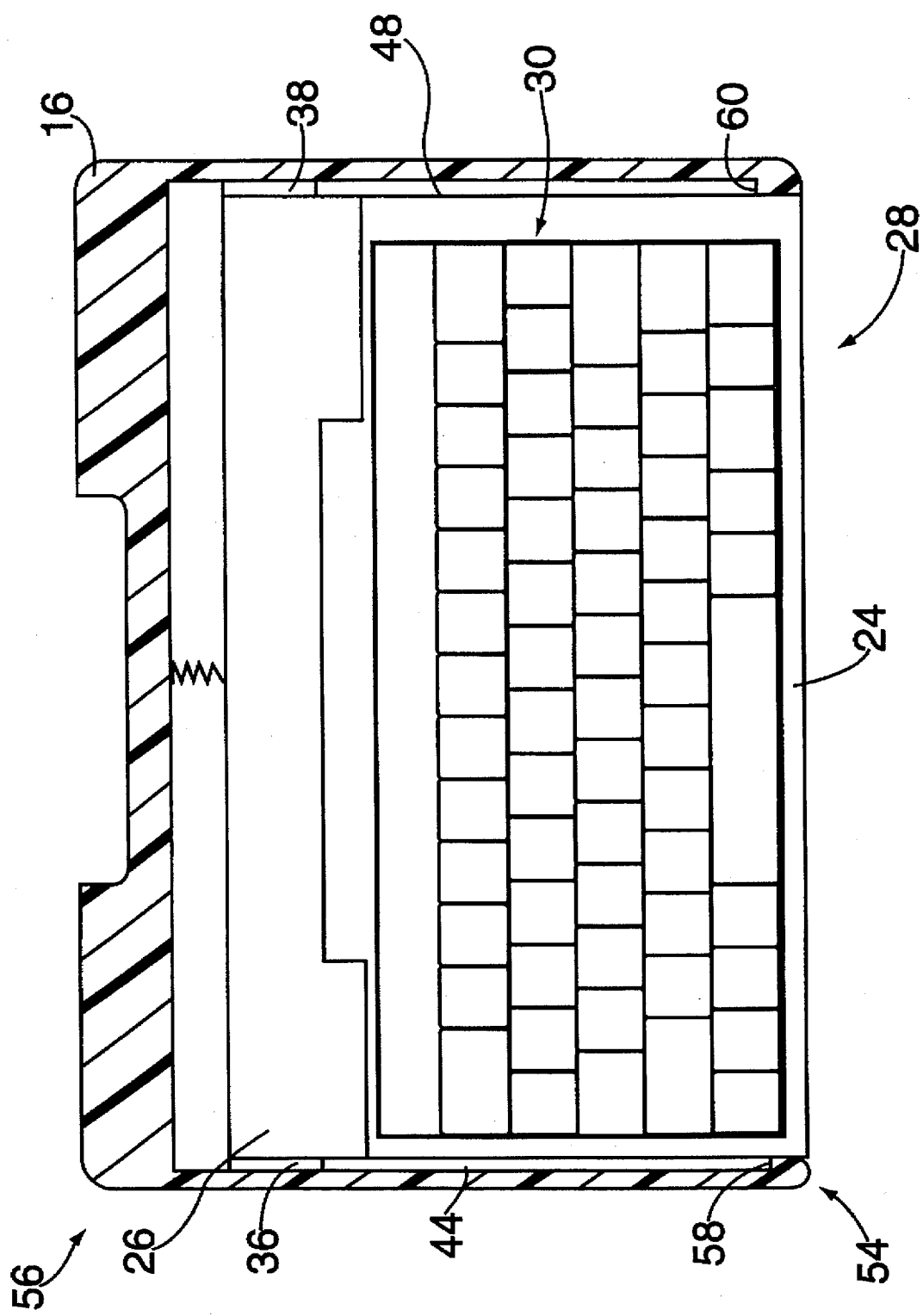
FIG. 5 is a partial cross sectional top view of a housing and keyboard.

Referring to FIG. 5, a partial cross sectional top view of the housing 16 and input key section 28 in the stowed position is shown. The first 44 and second 48 sliding surfaces extend between front 54 and back 56 ends of the housing 16. The first 44 and second 48 sliding surfaces are sized to enable the input key section 28 to be moved between the stowed and exposed positions. Further, the first 40 and second 42 slots include first 58 and second 60 contact surfaces, respectively. The first 36 and second 38 projecting portions abut against the first 58 and second 60 contact surfaces, respectively, upon movement of the input key section 28 to the exposed position. This stops further outward movement of the main block section 26.

Figure 6:
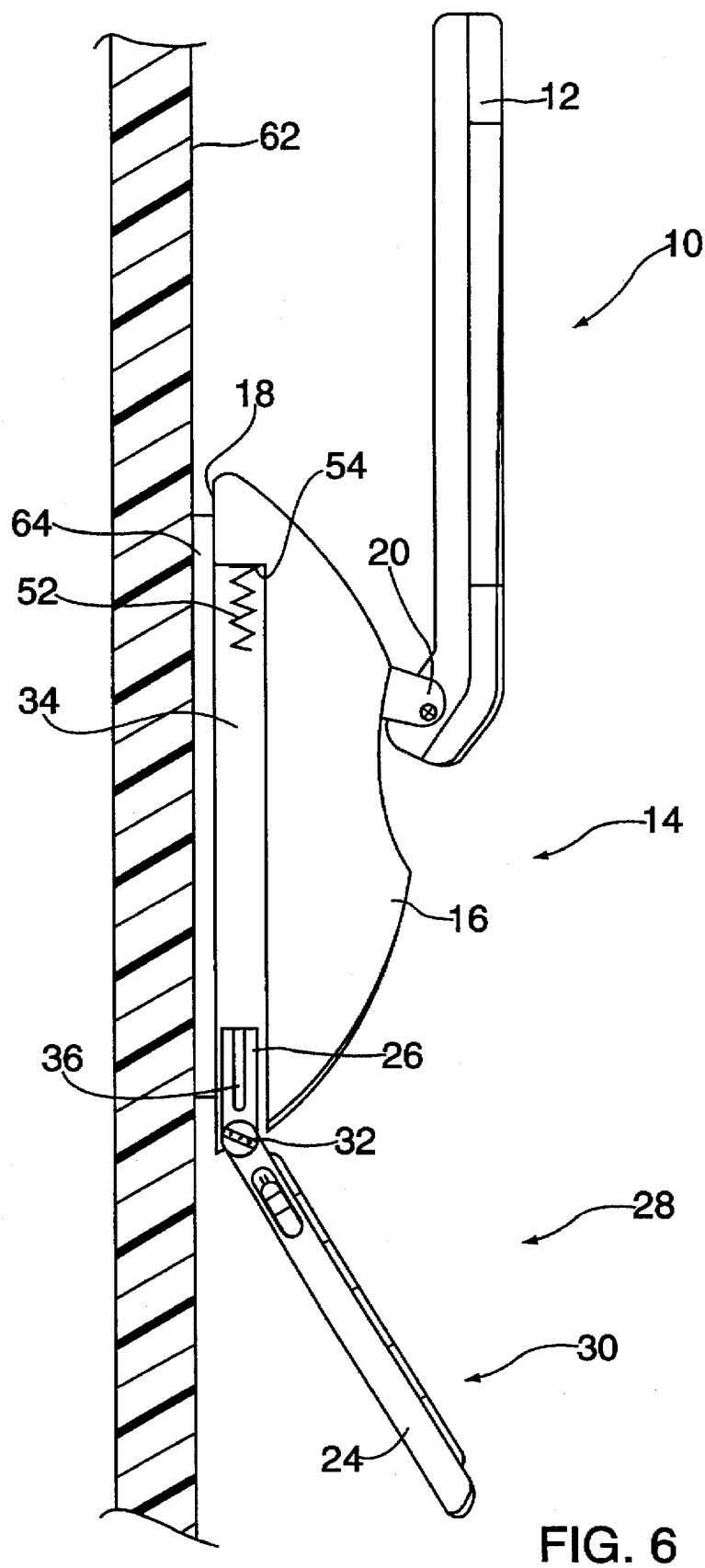
FIG. 6 is a view of the system in a wall mounted configuration.

Many of the components of a PC or a personal communications routing system are relatively large in size and are spread about a desk top or horizontal work surface. This reduces the amount of space available on the work surface and for the location of telephones and other office equipment. In accordance with the present invention, the system 10 may be also mounted on a wall of an office rather than being located on the desk top 22, thus increasing the amount of space that is available. Referring to FIG. 6, the system 10 is shown in a wall mounted configuration. In this configuration, the base surface 18 is oriented vertically and removably affixed to a vertical wall 62 by a wall adaptor 64 such as that used to removably affix a telephone to a wall. If the system 10 was initially in the desk top configuration, this results in the device 12 being oriented substantially horizontally and the input key section 28 being oriented substantially vertically. In accordance with the present invention, the device 12 is then rotated to a substantially vertical position which is suitable for viewing the device 12. Further, the input key section 28 may then be rotated to an orientation which is suitable for use by the user. By way of example, the input key section 28 is shown rotated approximately 30° from vertical. It is noted that other orientations for the input key section 28 may be selected as desired. Therefore, the system 10 may be utilized when wall mounted, thus enabling an increase in the amount of space available on the work surface. In addition, it is noted that the present invention may also be utilized on sloped work surfaces.

Thus, it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A computer system for use on a vertical surface, comprising:

a computer having a base with a cavity;

a viewing device for displaying information from said computer, said device being rotatably mounted to said computer to enable rotation of said computer and said device relative to each other; and input key means for inputting commands to said computer, said input key means being rotatably mounted to a main block section to enable rotation of said input key means relative to said computer, wherein upon placement of said base on said vertical surface said device is rotatable to a substantially vertical position suitable for viewing the device and said input key means is rotatable to a substantially vertical position suitable for accessing said input key means; and moving means for moving said input key means from a stowed position within said cavity to an exposed position.

2. The computer system according to claim 1, wherein said computer includes slots and said main block section includes projecting portions adapted for sliding on said slots to enable movement of said input key means between said stowed position and said exposed position.

3. The computer system according to claim 2, further including spring means for urging said input key means out of said cavity.

4. The computer system according to claim 1, further including mounting means for removably mounting said base to said surface.

5. A personal communications routing system for use on a surface, comprising:

a computer having a base with a cavity;

a viewing device for displaying information from said computer, said device being rotatably mounted to said computer to enable rotation of said computer and said device relative to each other;

input key means for inputting commands to said computer, said input key means being rotatably mounted to a main block section to enable rotation of said input key means relative to said computer, wherein upon placement of said base on said surface said device is rotatable to a substantially vertical position suitable for viewing the device and said input key means is rotatable to a sloped position suitable for accessing said input key means; and moving means for moving said input key means from a stowed position within said cavity to an exposed position.

6. The routing system according to claim 5, wherein said computer includes slots and said main block section includes projecting portions adapted for sliding on said slots to enable movement of said input key means between said stowed position and said exposed position.

7. The routing system according to claim 6, further including spring means for urging said input key means out of said cavity.

8. The computer system according to claim 5, further including mounting means for removably mounting said base to said surface.

9. A personal communications routing system for use on a vertical wall, comprising:

a computer having a base with a cavity;

a viewing device for displaying information from said computer, said device being rotatably mounted to said computer to enable rotation of said computer and said device relative to each other, wherein said device is rotatable to a viewing position in which said device is oriented substantially vertically and wherein simultaneously said computer is rotatable to a wall mounted position for affixing said base to said vertical wall; and input key means for inputting commands to said computer, said input key means being rotatably mounted to a main block section to enable rotation of said input key means relative to said computer, wherein upon placement of said base on said vertical wall said input key means is rotatable to a sloped position suitable for accessing said input key means; and moving means for moving said input key means from a stowed position within said cavity to an exposed position.

10. The routing system according to claim 9, wherein said computer includes slots and said main block section includes projecting portions adapted for sliding on said slots to enable movement of said input key means between said stowed position and said exposed position.

11. The routing system according to claim 10, further including spring means for urging said input key means out of said cavity.

12. The computer system according to claim 9, further including mounting means for removably mounting said base to said surface.

13. A keyboard for a computer, comprising:

input key means for inputting information to said computer;

a main block section rotatably attached to said input key means for enabling rotation of said input key means relative to said main block section; and moving means for moving said main block section and thus said input key means between a stowed position within said computer and an exposed position outside of said computer wherein said input key means is exposed to enable access to said input key means.

14. The keyboard according to claim 13, wherein said moving means includes first and second slots formed in said computer for receiving first and second projecting portions, respectively, which extend from said main block section.

15. The keyboard according to claim 13, wherein said computer includes a cavity and said main block section and said input key means are positioned within said cavity in said stowed position.

16. The keyboard according to claim 13, further including spring means for urging said main block section and thus said input key means to said exposed position.

17. A personal communications routing system for use on a wall, comprising:

a computer having a cavity and a base, said base including mounting means for removably affixing said base to said wall;

a viewing device for displaying information from said computer, said device being rotatably affixed to said computer to enable rotation of said computer and said device relative to each other;

a keyboard for providing input commands to said computer, wherein in a stowed position said keyboard is positioned within said cavity and in an exposed position said keyboard is moved out of said cavity;

a main block section rotatably affixed to said keyboard, said main block section having projecting portions adapted for sliding within slots formed in said computer to enable movement of said keyboard between said stowed position and said exposed position wherein said keyboard is rotated into a sloped position suitable for providing access to said keyboard; and spring means for urging said input key means out of said cavity.

18. The routing system according to claim 17, wherein said viewing device is a monitor.

19. The routing system according to claim 17, wherein said viewing device is a liquid crystal display.

* * * * *